(12) United States Patent
Aoki et al.

(10) Patent No.: US 7,574,277 B2
(45) Date of Patent: Aug. 11, 2009

(54) CONTROL SYSTEM UTILIZING SERIAL COMMUNICATION

(75) Inventors: Satoshi Aoki, Tokyo (JP); Syuya Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 531 days.

(21) Appl. No.: 10/567,460

(22) PCT Filed: Oct. 10, 2003

(86) PCT No.: PCT/JP03/13007

§ 371 (c)(1),
(2), (4) Date: Feb. 7, 2006

(87) PCT Pub. No.: WO2005/036288

PCT Pub. Date: Apr. 21, 2005

(65) Prior Publication Data

US 2006/0262807 A1    Nov. 23, 2006

(51) Int. Cl.
*G06F 19/00* (2006.01)
*G05B 15/02* (2006.01)
*G06F 3/00* (2006.01)
*G05B 23/02* (2006.01)
*G06F 15/16* (2006.01)
*G06F 15/173* (2006.01)

(52) U.S. Cl. ............... 700/100; 700/9; 710/10; 710/12; 340/3.1; 340/3.2; 709/208; 709/238

(58) Field of Classification Search ............ 700/100, 700/9; 710/10, 12; 340/3.1, 3.2; 709/208, 709/238

See application file for complete search history.

(56) References Cited

U.S. PATENT DOCUMENTS 5,400,331 A * 3/1995 Lucak et al. ............ 370/401
5,822,615 A * 10/1998 Yamashita et al. ........ 710/10

(Continued)

FOREIGN PATENT DOCUMENTS

EP    1288755 A1    3/2003

(Continued)

*Primary Examiner*—Ronald D Hartman, Jr.
*Assistant Examiner*—Sunray R Chang
(74) *Attorney, Agent, or Firm*—Sughrue Mion, PLLC (57) ABSTRACT

It is an object to enhance the reliability of an emergency stop in a control system, such as an NC apparatus system, in which, in order to reduce a dedicated line for an emergency stop, emergency-stop information is embedded in an ordinary serial-data frame. For that purpose, extracting units (125) and (126) are provided in a client control apparatus, for extracting emergency-stop data and frame-error check data from a frame that is transmitted from a host control apparatus or other client control apparatuses to the client control apparatus. Moreover, outputting circuits (128), (129), and (130) are provided in the client control apparatus, for, by checking the frame-error check data extracted by the extracting units, determining whether or not the frame has been generated normally in the host control apparatus or the other client control apparatuses, and outputting the emergency-stop data to an apparatus to be controlled when the emergency-stop data is embedded in the serial-data communication frame, and condition in which the frame is not generated normally in the host control apparatus or the other client control apparatuses is continued for a duration corresponding to a plurality of frames.

18 Claims, 9 Drawing Sheets

U.S. PATENT DOCUMENTS 5,946,215 A * 8/1999 Mito .................... 700/169
6,182,163 B1 * 1/2001 Yamashita et al. ............ 710/12

FOREIGN PATENT DOCUMENTS

| JP | 1-141442 A | 6/1989 |
| JP | 2-235146 A | 9/1990 |
| JP | 6-14040 A | 1/1994 |
| JP | 8-328636 A | 12/1996 |
| JP | 11-231923 A | 8/1999 |
| JP | 2002-329284 A | 11/2002 |

* cited by examiner

CONTROL SYSTEM UTILIZING SERIAL COMMUNICATION

TECHNICAL FIELD

The present invention relates to a technology for, in a control system utilizing serial communication that controls a motor and the like for driving a machine tool or an industrial robot, communicating emergency-stop information so that a motor or the like is immediately stopped in an emergency and power is cut off.

BACKGROUND ART

Figure 11:
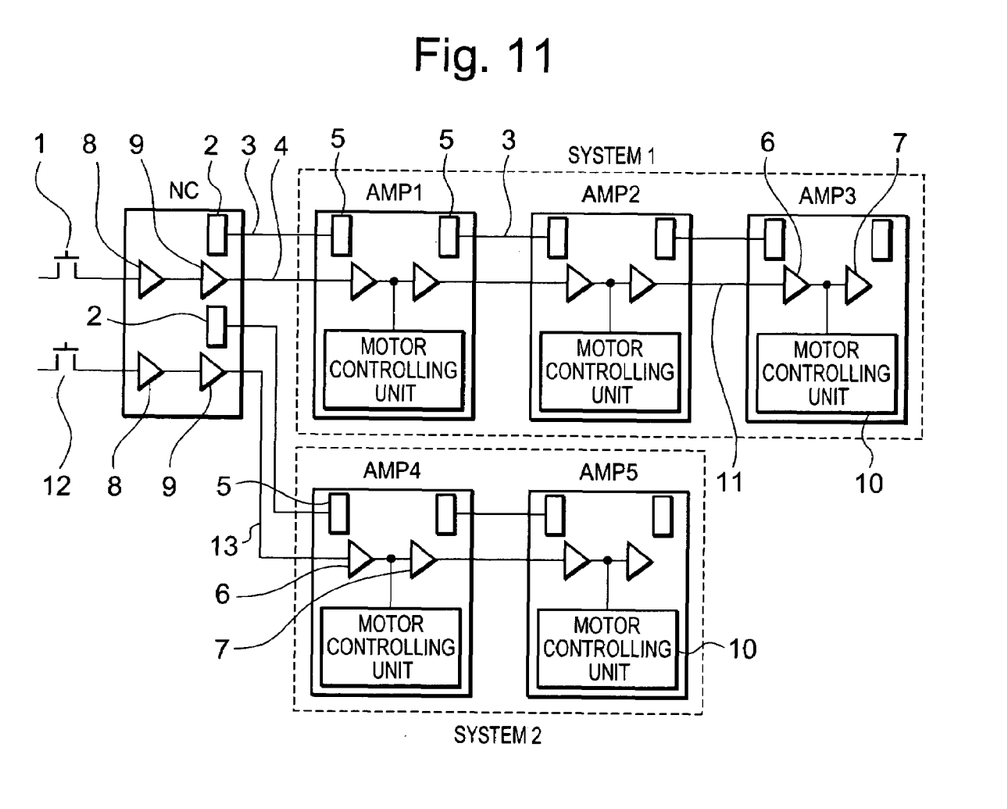
FIG. 11 is a view illustrating a conventional technology.

The technology related to the present invention will be explained, taking a numerical control system as an example. In various types of machine tools such as a machining center and a lathe, actual machining of a work (material to be lathed) requires driving of a table for fixing the work, a chuck, and a tool (machine tool). A spindle motor and a servo motor that rotate or position-control tools and works in order to perform machining, in accordance with programmed instructions, play the role of driving; apparatuses for actually rotating and controlling the spindle and servo motors are drive control apparatuses (AMP1, AMP2, AMP3, AMP4, and AMP5 in FIG. 11). In addition, a control system referred to as a numerical control system (NC apparatus, hereinafter) outputs instructions to the drive control apparatuses. FIG. 11 is a block diagram illustrating a conventional NC apparatus system. Reference numeral 2 denotes input/output connectors for transmitting and receiving instructions from the NC apparatus, for controlling a position, a speed, and the like, and data from the drive control apparatuses; Reference numeral 3 denotes communication cables for transmitting and receiving control information and the like, between the NC apparatus and the drive control apparatus or between the drive control apparatuses. An instruction from the NC apparatus is inputted through the input/output connector 2 and communicated to each of the drive control apparatuses by way of the communication cable 3 and an input/output connector 5. Each drive control apparatus that has received the instruction controls driving of a motor based on the information by a motor controlling unit 10. In this situation, feedback data and the like from the motor leaves the motor controlling unit 10, passes again through the communication cable 3 and the input/output connector 5, and then is received by the NC apparatus through the input/output connector 2.

From the fail-safe point of view in which, when an emergency-stop signal is generated or when an interruption of a signal occurs at any position within communication circuits, it is determined that an emergency stop is instructed, a dedicated emergency-stop-signal transmitting and receiving cable independent from the communication cable 3 for the control data has been provided as an emergency-stop signal line. Reference numeral 1 denotes an emergency-stop switch utilized upon an emergency stop; the in-bound emergency-stop signal is received by the NC apparatus through a receiver 8 mounted in the NC apparatus, and is outputted by a driver 9 to the drive control apparatus by way of the emergency-stop-signal transmitting and receiving cable 4. Similarly, each drive control apparatus receives through a receiver 6 the emergency-stop signal and outputs through a driver 7 emergency-stop data to the following drive control apparatus. With regard to an emergency-stop signal, its reliability is most important and so it is required to prevent a malfunction. Therefore, in order to suppress effects of noise and the like, that cause the malfunction, in the emergency-stop-signal transmitting and receiving cables 4 between the NC apparatus and the drive control apparatus and between the drive control apparatuses, signals are utilized on a voltage level far higher than that of a control signal utilized within the drive control apparatus. In addition, in some cases, signals are transmitted and received as differential signals also in order to prevent the malfunction. Accordingly, due to the difference in the voltage level and the data format, the motor controlling unit is not able to deal with the emergency-stop signal; therefore, data that is inputted and outputted through the receiver 6, the driver 7, the receiver 8, and the driver 9 is converted with regard to an electric level, and the differential signals are converted.

The drive control apparatus that has received through these receivers the emergency-stop signal from the NC apparatus processes in the motor controlling unit 10 the emergency-stop signal, immediately halts the motor, and cuts off driving power for the motor. In addition, in the case where, as belt conveyer lines arranged in parallel to one another, each of systems controlled by the NC apparatus does not physically interfere with one another, and, even though one system is to be halted, other systems need to be operated, it is impossible to output the emergency-stop line from a single driver. Therefore, in the case where a plurality of systems are divided as illustrated in FIG. 11, in a conventional system in which an emergency stop line should be provided separately from a communication system line, a dedicated emergency-stop-signal transmitting and receiving cable 13 including an emergency stop button 12, for a system 2, should be provided, in addition to the emergency stop button 1 and the emergency-stop-signal transmitting and receiving cable 3, for a system 1.

With regard to the emergency stop line, reliability is most important from the fail-safe point of view; therefore, it has been indispensable to provide a dedicated line independent from a data communication line (the communication cable 3) for controlling systems. Accordingly, there has been a problem in that, in carrying out connection between the NC apparatus and the drive control apparatus and between drive control apparatuses for respective axles, wiring for the data communication cable 3 and the emergency-stop-signal transmitting and receiving cables 4 and 13 has been complex.

Moreover, in the case where a plurality of systems are controlled by the same NC apparatus, the number of connectors provided for connecting emergency stop lines needs to be increased with increase of the number of systems; therefore, problems, such as raised complexity of a system configuration through hardware and increase in costs, have occurred.

Furthermore, in order that, even though an emergency-stop signal is affected by noise or the like, in a path between the NC apparatus and the drive control apparatus, or between drive control apparatuses for respective axles, no lost portion and no extinction of the emergency-stop signal occurs, the voltage level of the signal is raised higher than the voltage level utilized in the motor controlling unit, and, in some cases, differential signals are utilized; in consequence, a problem is posed that a signal level converter or the like is required in each drive control apparatus.

In order to reduce a dedicated line for an emergency stop, there is an approach in which, by embedding an emergency-stop signal in a frame of serial data for communication, emergency stop is carried out simply through a communication line; as examples of a conventional art, "Terminal-Apparatus Monitoring System in Ring-Shape Communication System" (Japanese Laid-Open Patent Publication No. 1992-167835) and "Loop-Shaped Light Transmission System" (Japanese Laid-Open Patent Publication No. 1989-141442) disclose an approach in which a warning is contained in a frame. In addition, as another conventional art, "Controlling Method for Distributed Remote-I/O Control System" (Japanese Laid-Open Patent Publication No. 1996-328636) discloses an approach in which, by adding CRC (Cyclic Redundancy Check) codes to serial data in a frame, the serial data is automatically checked.

However, in the foregoing "Terminal-Apparatus Monitoring System in Ring-Shape Communication System", only one serial-data frame for transmitting data is provided in each of ring-shaped communication loops, and the frame contains as warning bits warning information for all terminal apparatuses; therefore, measures against the case where a bidirectional communication is simultaneously defective are imperfect, and the system has a disadvantage in responding quickly because a principal apparatus determines treatment for the warning and then outputs instructions to terminal apparatuses. Moreover, similarly, the foregoing "Loop-Shaped Light Transmission System" is a system in which, for warning information outputted by a terminal apparatus, the principal apparatus by all means determines and outputs treatment for the warning; therefore, the system has the same disadvantage as the "Terminal-Apparatus Monitoring System in Ring-Shape Communication System" has.

Furthermore, in the foregoing "Controlling Method for Distributed Remote-I/O Control System", an error and the number of frames are monitored by means of the CRC codes; however, all the checks are carried out by the principal apparatus, whereby the system has disadvantage in reliability in the case where the principal apparatus is out of order.

DISCLOSURE OF THE INVENTION

The present invention is to solve the foregoing problems; it is an object of the present invention to enhance the reliability of an emergency stop in the case where a communication method is implemented in which emergency-stop information is included in a serial-data frame for transmitting and receiving information for control and communication.

For that purpose, the present invention provides a control system utilizing serial-data communication, in which the serial-data communication between a host control apparatus and at least one client control apparatus is performed, the control system comprising: a means provided in the host control apparatus, for embedding emergency-stop data in a serial-data communication frame when a malfunction occurs inside the host control apparatus or when an emergency-stop signal is inputted to the host control apparatus, for embedding predetermined frame-error check data in the serial-data communication frame each time the serial-data communication frame is generated, and for outputting the frame to the client apparatus; an extracting means provided in the client control apparatus, for extracting the emergency-stop data and the frame-error check data from the frame that is transmitted from the host control apparatus to the client control apparatus; and a means provided in the client control apparatus, for determining whether or not the frame has been generated normally in the host control apparatus by checking the frame-error check data extracted by the extracting means, and for outputting to an apparatus to be controlled the emergency-stop data when the emergency-stop data is embedded in the serial-data communication frame and condition in which the frame is not generated normally in the host control apparatus is continued for a duration corresponding to a plurality of frames.

Moreover, the present invention provides a control system utilizing serial-data communication, in which the serial-data communication between a host control apparatus and at least one client control apparatus is performed, the control system comprising: a means provided in the client control apparatus, for embedding emergency-stop data in a serial-data communication frame to be outputted by the client control apparatus when a malfunction occurs inside the client control apparatus, for embedding predetermined frame-error check data in the serial-data communication frame to be outputted by the client control apparatus each time the serial-data communication frame is generated, and for outputting the frame to the host control apparatus; an extracting means provided in the host control apparatus, for extracting the emergency-stop data and the frame-error check data from the frame that is transmitted from the client control apparatus to the host control apparatus; and a means provided in the host control apparatus, for determining whether or not the frame has been generated normally in the client control apparatus by checking the frame-error check data extracted by the extracting means, and for determining that the client control apparatus is out of order when the emergency-stop data is embedded in a serial-data communication frame and condition in which the frame is not generated normally in the client control apparatus is continued for a duration corresponding to a plurality of frames.

Still moreover, the present invention provides A control system utilizing serial-data communication, in which the serial-data communication between a host control apparatus and a plurality of client control apparatuses, or among the plurality of client control apparatuses is performed, the control system comprising: a means provided in the client control apparatus, for embedding emergency-stop data in a serial-data communication frame to be outputted by the one client control apparatus when a malfunction occurs inside the client control apparatus or when an emergency-stop signal is inputted to the one client control apparatus, for embedding predetermined frame-error check data in the serial-data communication frame to be outputted by the client control apparatus each time the serial-data communication frame is generated, and for outputting the frame to the host control apparatus and/or the other client control apparatus; an extracting means provided in the client control apparatus, for extracting the emergency-stop data and the frame-error check data from the frame that is transmitted from the host control apparatus and/or the other client control apparatuses to the client control apparatus; and a means provided in the client control apparatus, for determining whether or not the frame has been generated normally in the host control apparatus and/or the other client control apparatus by checking the frame-error check data extracted by the extracting means, and for outputting to an apparatus to be controlled the emergency-stop data when the emergency-stop data is embedded in the serial-data communication frame and condition in which the frame is not generated normally in the host control apparatus and/or the other client control apparatus is continued for a duration corresponding to a plurality of frames.

Furthermore, the present invention provides the control system in which the means for embedding the frame-error check data in the frame generates the frame-error check data to which a specific numerical value is added each time the serial-data communication frame is generated, when the frame is generated normally, and embeds the frame-error check data in the frame; and the means for determining compares previously received frame-error check data with presently received frame-error check data, and determines that the frame is not generated normally when a difference value between the previously received frame-error check data and the presently received frame-error check data is different from the specific numerical value.

Accordingly, it is possible to transmit emergency-stop data along with transmission data, such as a positional instruction, in serial data. The system determines that the client control apparatus is out of order when the emergency-stop data is embedded in a serial-data communication frame, and condition in which the frame is not generated normally in the host control apparatus and/or the client control apparatus is continued for a duration corresponding to a plurality of frames. Therefore, the system does not inappropriately come to an emergency stop, whereby the reliability of an emergency stop can be enhanced.

Still furthermore, the present invention provides a control system utilizing serial-data communication, in which the serial-data communication between a host control apparatus and a plurality of client control apparatuses, or among the plurality of client control apparatuses is performed, the control system comprising: a means provided in the client control apparatus, for embedding emergency-stop data generated by the other client control apparatus in a frame to be outputted by the client control apparatus, and transmitting the frame to the host control apparatus and/or the other client control apparatus.

In consequence, even when the transmission data from a client control apparatus transmitting an emergency-stop signal becomes erroneous due to noise or the like, it is possible for the other client control apparatuses to transmit the emergency-stop signal. Therefore, the reliability of emergency stop can be raised.

Still moreover, the present invention provides a control system utilizing serial-data communication, in which the serial-data communication between a host control apparatus and a plurality of client control apparatuses, or among the plurality of client control apparatuses is performed, the control system comprising: a means provided in the client control apparatus, for, embedding emergency-stop data generated in the control apparatus when a malfunction occurs inside the one control apparatus and emergency-stop data generated in the other control apparatus in a serial-data communication frame to be outputted by the client control apparatus, for, embedding predetermined frame-error check data in the serial-data communication frame to be outputted by the client control apparatus each time the serial-data communication frame is generated, and for outputting the frame to the client control apparatus and/or the other client control apparatus; an extracting means provided in the client control apparatus, for extracting the emergency-stop data and the frame-error check data from the frame that is transmitted from the host control apparatus, or the other client control apparatus, to the client control apparatus; and a means provided in the client control apparatus, for determining whether or not the frame has been generated normally in the host control apparatus or the other client control apparatus by checking the frame-error check data extracted by the extracting means, and for outputting to an apparatus to be controlled the emergency-stop data when emergency-stop data is embedded in the serial-data communication frame and condition in which the frame is not generated normally in the host control apparatus or the other client control apparatus is continued for a duration corresponding to a plurality of frames.

Accordingly, it is possible to transmit emergency-stop data along with transmission data, such as a positional instruction, in serial data. The system determines that the client control apparatus is out of order when the emergency-stop data is embedded in a serial-data communication frame, and condition in which the frame is not generated normally in the host control apparatus and/or other client control apparatuses is continued for a duration corresponding to a plurality of frames. Therefore, the system does not inappropriately come to an emergency stop, whereby the reliability of an emergency stop can be enhanced.

In addition, even when the transmission data from a client control apparatus transmitting an emergency-stop signal becomes erroneous due to noise or the like, it is possible for other client control apparatuses to transmit the emergency-stop signal. Therefore, the reliability of emergency stop can be raised.

Furthermore, the present invention comprising a counting unit provided in the host control apparatus and/or the client control apparatus for counting the number of the received frames; and a means provided in the host control apparatus and/or the client control apparatus, for outputting the emergency-stop signal in the case where a specific number of frames are not received.

Accordingly, by always monitoring an upper-layer (a lower-layer) signal, a malfunction in communication can immediately be detected regardless of whether or not an emergency-stop signal exists. Therefore, the reliability against a malfunction in communication can be enhanced.

BEST MODE FOR CARRYING OUT THE INVENTION

Embodiment 1

Embodiment 1 of the present invention will be explained below with reference to FIGS. 1 through 6.

Figure 1:
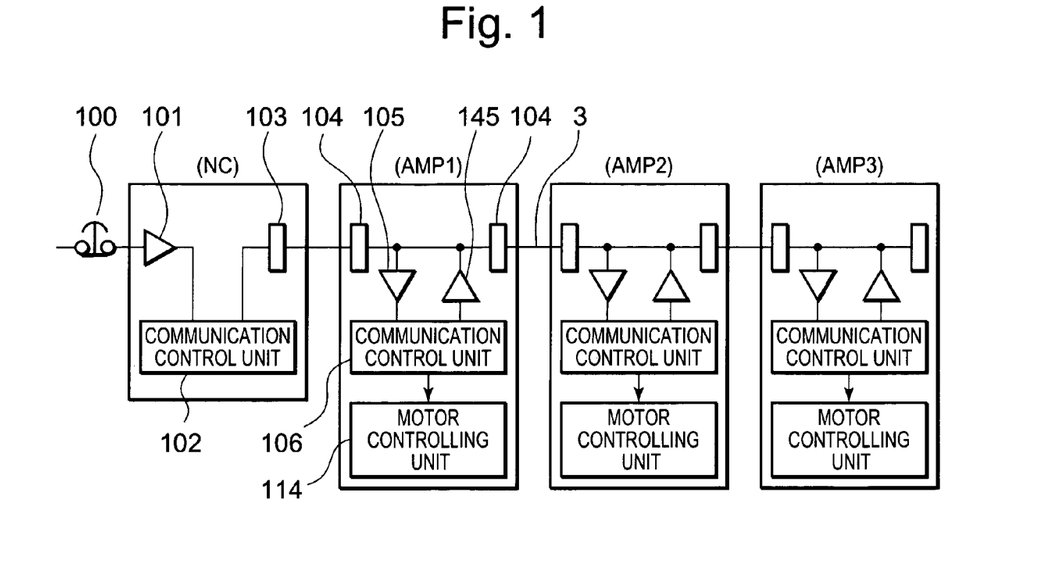
FIG. 1 is a block diagram illustrating an emergency-stop control system according to Embodiment 1 of the present invention.

FIG. 1 is a block diagram illustrating an emergency-stop control system utilizing serial communication, according to Embodiment 1 of the present invention. With regard to an emergency-stop function, reliability is most important under which none of malfunction, defective operation, and the like occurs; therefore, also in the present invention in which emergency-stop information is transmitted as serial data, the reliability of the data is most important. Thus, the emergency-stop control system is provided with various types of data-checking functions. In FIG. 1, for example, +24 V is applied to an emergency-stop signal from an emergency stop switch 100 provided outside an NC apparatus (host apparatus), whereby the voltage level of the emergency-stop signal is higher than the voltage level (generally, +5 V) utilized within the NC apparatus; therefore, a voltage-level converter 101 is utilized to convert the voltage level of the emergency-stop signal into 5 V, thereby enabling the emergency-stop signal to be received. The received emergency-stop signal, along with other control data, is converted in a communication control unit 102 into serial data, whereby it is enabled to transmit the emergency-stop signal through a communication connector 103 to drive control apparatuses.

Figure 2:
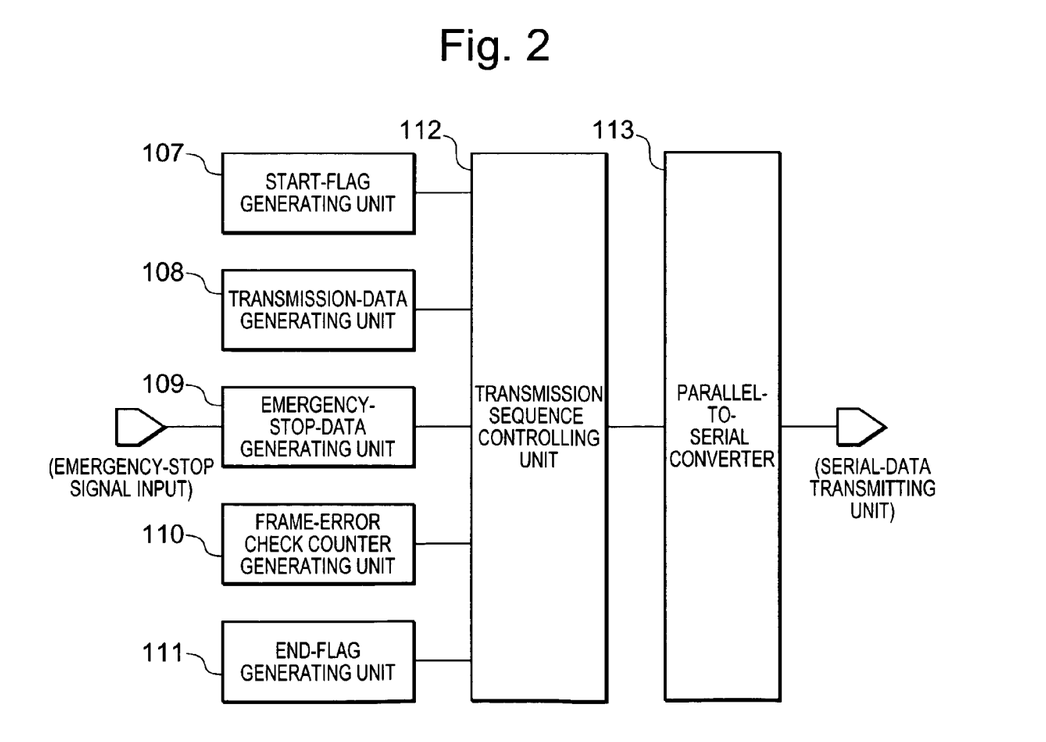
FIG. 2 is a block diagram illustrating details of a serial-data transmitting unit in a communication control unit in FIG. 1.
Figure 3:
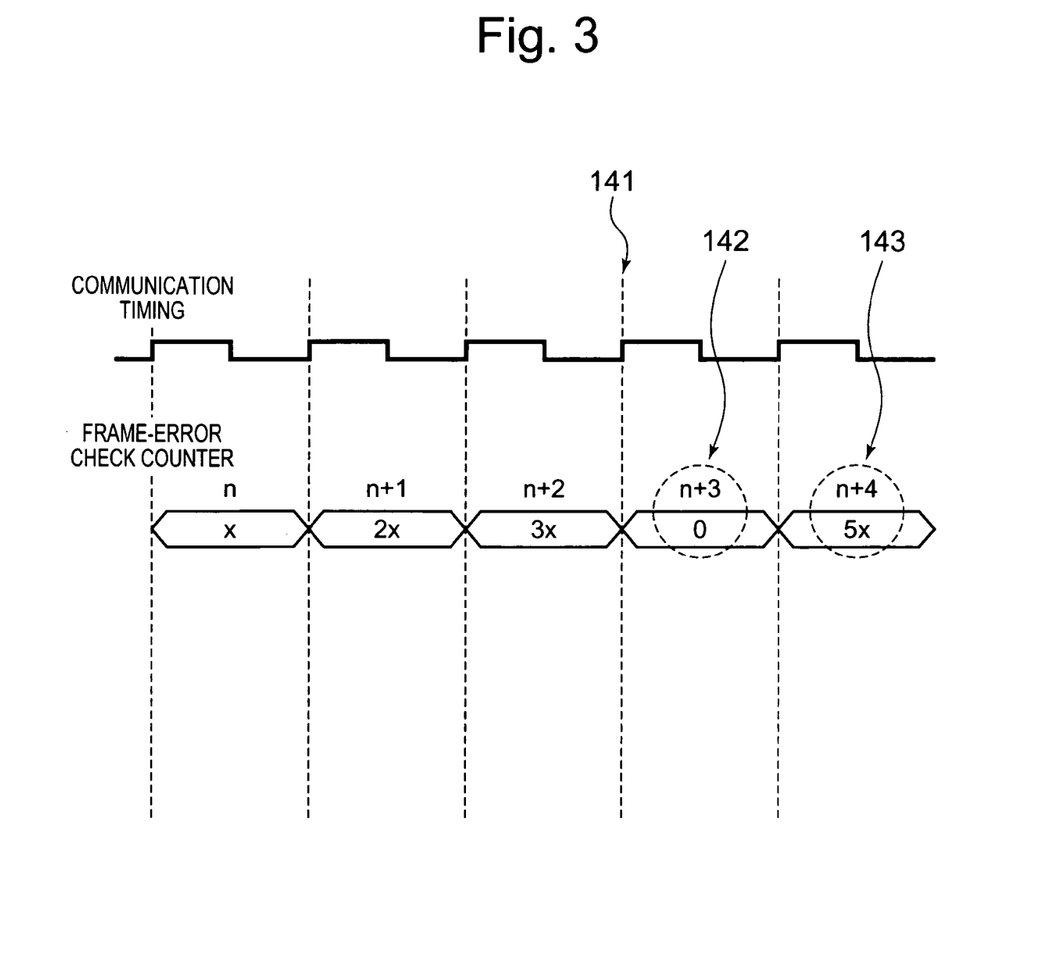
FIG. 3 is a diagram representing serial-data transmission timing according to Embodiment 1 of the present invention.

The details of the conversion, in the communication control unit 102, into the transmission serial data is illustrated in FIG. 2, and the transmission timing chart for the serial data is illustrated in FIG. 3. Data that is transmitted and received between the NC apparatus and each of the drive control apparatuses includes a start-flag generating unit 107 for, on reception, generating a start flag required to start reception sequence, a transmission-data generating unit 108 for generating transmission data in which a positional instruction, a speed instruction, and other data for communication or the like are put together; an emergency-stop-data generating unit 109 for generating an emergency-stop data that has been inputted through the receiver 101 to the NC apparatus, a frame-error check counter generating unit 110 for, in order to secure the normal state of a transmission frame, adding every time a preset value to a frame-error check counter area in the transmission frame, and an end-flag generating unit 111 for generating an end flag that indicates an end of data transmission.

In addition, the "frame error" described herein does not denote an error that is caused by serial data being lost upon communication, due to effects of noise or the like, but denotes a state in which, when a frame of serial data is generated, a specified frame is not generated due to hardware, software, or the like, and in which the preset value is not normally added to a count value of the frame-error check counter, thereby indicating a state in which the data in a generated frame has no reliability. FIG. 3 illustrates communication timing in the case where a frame error occurs. In FIG. 3, the upper portion illustrates the communication timing, and the lower portion represents a frame-error check counter, in frame-error check counter generating unit 110, to which a specified number (x, in this case) is added every control timing. When normal data processing has been implemented, the numerical value of the frame-error check counter is increased by x every communication cycle. However, in the case where, at the communication timing 141, data generating is not normally implemented due to defects in hardware, software, or the like, the numerical value of the frame-error check counter is not a value obtained by adding the specified number x to the previous numerical value, but an arbitrary value. FIG. 3 represents the following situation: in normal state, the numerical value of the frame-error check counter should be 4x at communication timing 142, and 5x, at communication timing 143; however, due to error at communication timing 141, the numerical value of the frame-error check counter is 0 at the communication timing 142.

These data such as a start flag are configured, as parallel data, in a transmission sequence controlling unit 112. In communication between the NC apparatus and amplifiers, data is transmitted and received as serial data; therefore, the parallel data is converted in a parallel-to-serial converter 113 into serial data and is transmitted from the NC apparatus, through the transmission connector 103. As described above, by transmitting a signal from the NC apparatus as serial data including an emergency-stop signal, it is possible to transfer the emergency-stop signal as data through data communication. In other words, an emergency stop can be realized merely by using a communication line, whereby no dedicated line is required.

Figure 4:
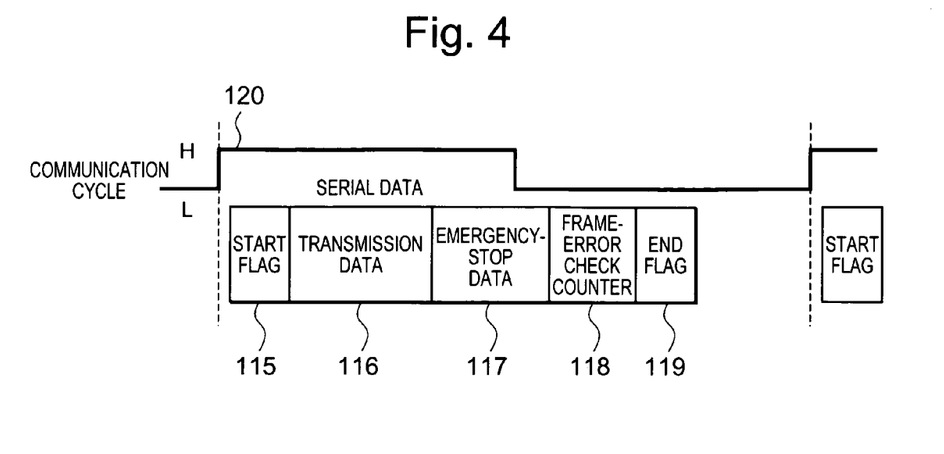
FIG. 4 is a diagram representing structure and transmission timing for serial data corresponding to a single communication-frame according to Embodiment 1 of the present invention.

FIG. 4 illustrates the configuration and the transmission timing of serial data corresponding to one communication frame, outputted from the transmission connector 103. The serial data to be transmitted includes a start flag 115, transmission data 116, emergency-stop data 117, frame-error check counter 118, and an end flag 119; at the timing when a communication flag 120 becomes H (positive), serial communication is started, and then the frame of the serial data is transmitted to the drive control apparatus. In this situation, the serial data includes emergency-stop information, whereby emergency-stop control utilizing data communication is enabled. The drive control apparatus (client control apparatus) receives serial data sent out from the NC apparatus-side transmission connector 103 in FIG. 1 by an amplifier-side reception connector 104, take the serial data in a communication control unit 106 via a serial data reception driver 105, and applies-reception processing to the serial data.

Figure 5:
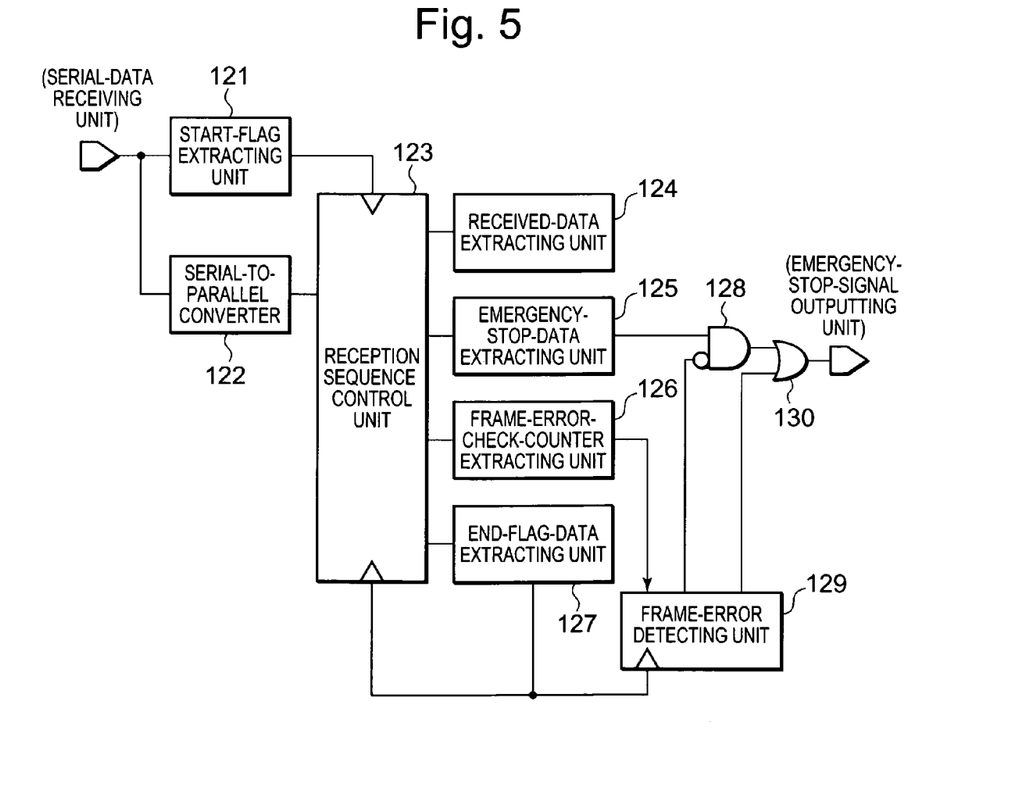
FIG. 5 is a block diagram illustrating details of a serial-data receiving unit in the communication control unit in FIG. 1.

In this regard, FIG. 5 illustrates processing procedure for the serial data that has been received by the communication control unit 106. The received serial data as it is can not be data-processed in the communication control unit 106; therefore, by utilizing a serial-to-parallel converter 122, the serial data from the NC apparatus is converted into parallel data so as to be utilized in the amplifier-side communication control unit 106. In a start flag extracting unit 121, a start flag is extracted from the serial data. When receiving the extracted start flag, a reception sequence control unit 123 sequentially separates the parallel data converted in the serial-to-parallel converter 122 from the serial data into respective data for a received-data extracting unit 124, an emergency-stop-data extracting unit 125, a frame-error-check-counter extracting unit 126, and an end-flag-data extracting unit 127, extracts the respective data, and transmits them to each of the extracting units 124 through 127, sequentially. The data, for instruction, communication, and the like, extracted in the received-data extracting unit 124 is transmitted to a motor controlling unit 114 to be utilized for actual control. When extracting the end flag, the end-flag-data extracting unit 127 transmits the end flag to the reception sequence control unit 123 and a frame-error detecting unit 129. When receiving the end flag from the end flag extracting unit 127, the reception sequence control unit 123 ends the reception sequence processing.

Figure 6:
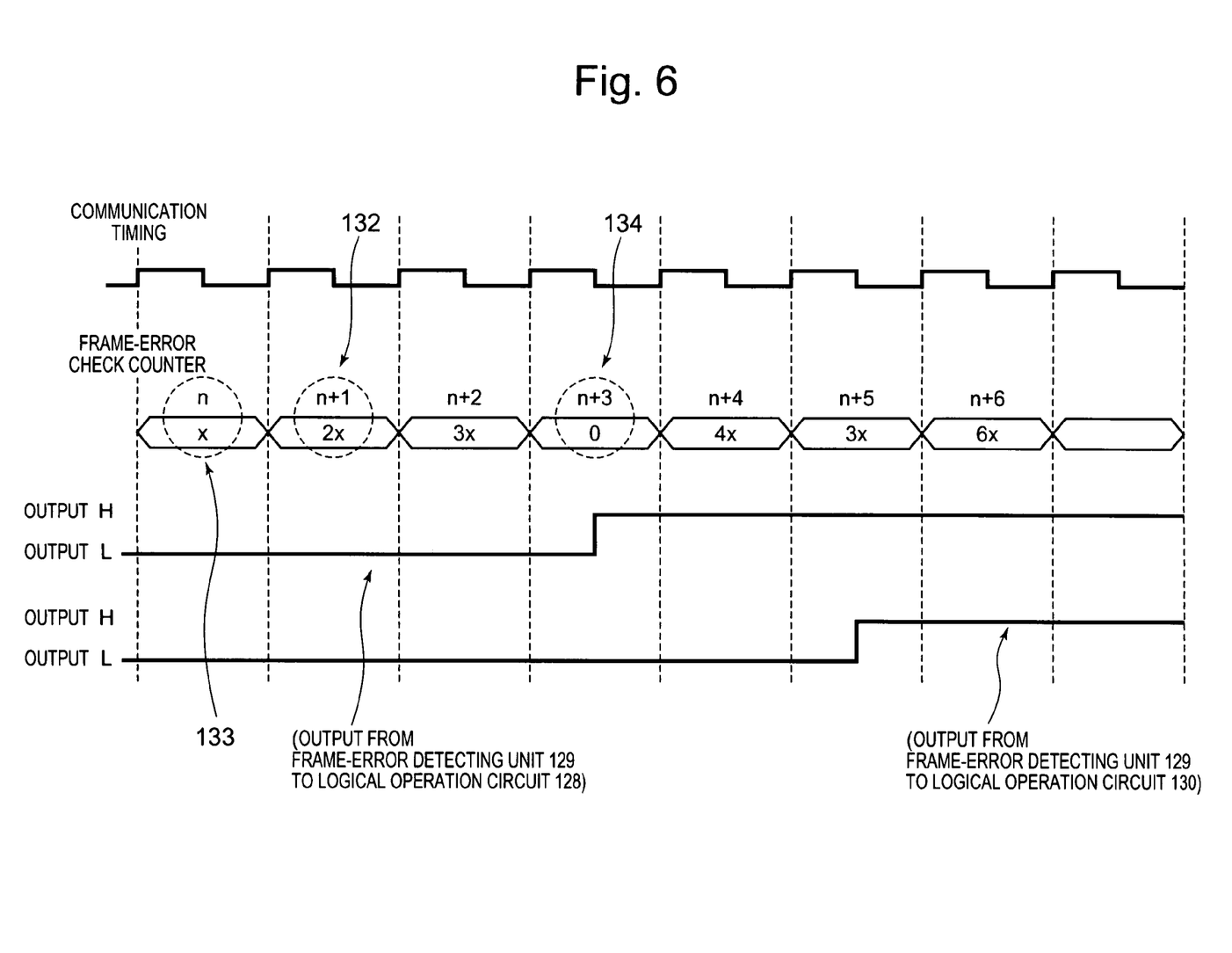
FIG. 6 is a diagram representing frame-error detection timing according to Embodiment 1 of the present invention.

Immediately after the reception sequence processing has been ended, in order to ascertain reliability of the received data, the frame-error detecting unit 129 that has received the end flag data compares the numerical value of the frame-error check counter, generated in the frame-error check counter generating unit 110, with the previous value, thereby determining whether or not the data has correctly been generated. FIG. 6 represents timing when an frame error is detected. The receiving-side frame-error detecting unit 129 reads frame-error check counter, that is updated by the transmitting-side frame-error check counter generating unit 110, every processing period. The receiving-side frame-error detecting unit 129 stores received data (in this case, data x at timing n indicated by Reference Numeral 133) previous to the frame-error check counter (e.g., data 2x at timing n+1 indicated by Reference Numeral 132) in the presently received frame, and calculates the difference value $(2x-x=x)$ between the frame-error check counter in the presently received frame and the frame-error check counter in the previously received frame. If the difference value coincides with the numerical value (x) that has been added in the frame-error check counter generating unit 110, it is determined that there is no malfunction in the process of data generation, that the processing has normally been completed, and that the received frame is normal data; an output from the frame-error detecting unit 129 to a logical operation circuit 128 is made to be L (negative). If the difference value (0−3x=−3x) between data (e.g., data 0 at timing n+3 indicated by Reference Numeral 134) in the presently received frame and data (data 3x at timing n+2, in this case) in the previously received frame differs from the added numerical value (x), it is determined that the data generation has not normally been implemented, and that the received frame is not reliable; the output to the logical operation circuit 128 is made to be H (positive). As described above, providing the frame-error check counter enables the reliability of a received frame to be ascertained.

The frame-error detecting unit 129 outputs to the logical operation circuit 128 the result of determination on the reliability of a frame. By calculating a logical sum of the signal from the frame error detector 129 and the emergency-stop signal from the emergency-stop-data extracting unit 125, the logic operator 128 can outputs an emergency-stop signal only when the received data is normal, and data from the received-data extracting unit includes emergency-stop information; therefore, an unnecessary emergency stop can be avoided. However, in the case where frame errors are detected successively a plurality of times (in FIG. 6, successively three times, i.e., n+3, n+4, and n+5), it is determined that there is a problem on the data-generation side, and, as represented in the bottom portion in FIG. 6, the frame-error detecting unit 129 outputs a determination result of H (positive) also to a logical operation circuit 130. The logical operation circuit 130 is enabled to output an emergency-stop signal when detecting an emergency-stop signal from the logical operation circuit 128 or H (positive) data from the frame-error detecting unit 129; accordingly, the logical operation circuit 130 also has a function of outputting an emergency-stop signal also in the case where frames have not normally been generated a plurality of times, thereby enhancing the reliability of an emergency stop.

In addition, in Embodiment 1, the case has been explained in which, when an emergency-stop signal is inputted to an NC apparatus, the emergency-stop data is embedded in a frame; however, an emergency-stop data may be embedded when a malfunction occurs within the NC apparatus.

Moreover, in Embodiment 1, the constituent elements illustrated in FIG. 2 are provided in the NC apparatus, and the constituent elements illustrated in FIG. 5 are provided in the drive control apparatuses; however, by providing in the drive control apparatuses and in the NC apparatus the constituent elements illustrated in FIG. 2 and the constituent elements illustrated in FIG. 5, respectively, thereby, when a malfunction occurs in the drive control apparatus, embedding emergency-stop data in a frame and transmitting the frame to the NC apparatus, the malfunction may be detected in the NC apparatus.

Furthermore, in Embodiment 1, the constituent elements illustrated in FIG. 2 are provided in the NC apparatus, and the constituent elements illustrated in FIG. 5 are provided in the drive control apparatuses; however, by providing in the drive control apparatuses the constituent elements illustrated in FIG. 2 and the constituent elements illustrated in FIG. 5 (the detailed configuration is substantially the same as that illustrated in FIG. 7), thereby, when a malfunction occurs in the drive control apparatus, embedding emergency-stop data in a frame and transmitting the frame to the NC apparatus or to other drive control apparatuses, the malfunction may be detected in the NC apparatus or in those other drive control apparatuses, through the emergency-stop data.

Embodiment 2

Next, Embodiment 2 of the present invention will be explained with reference mainly to FIGS. 7 and 8.

Figure 7:
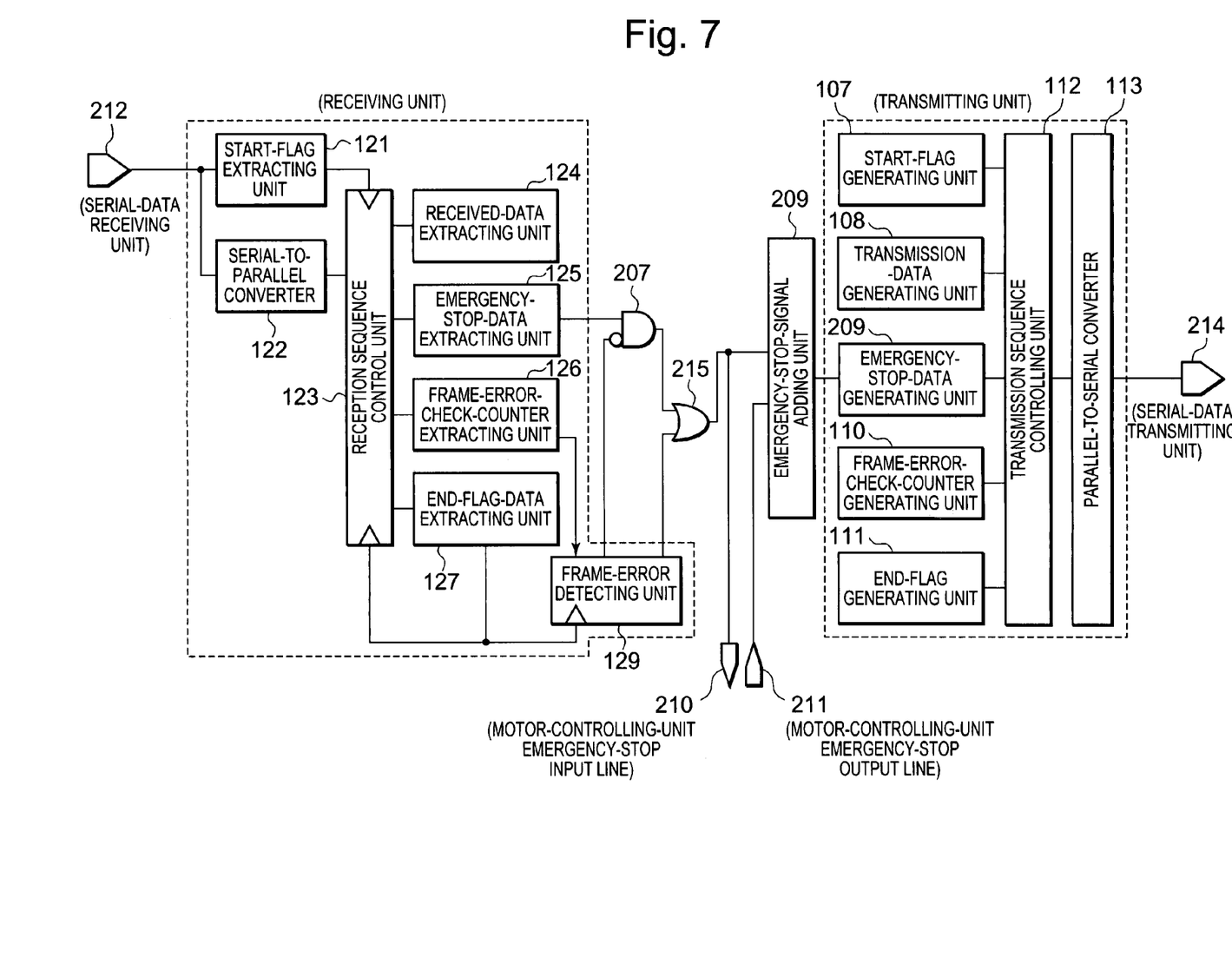
FIG. 7 is a block diagram illustrating an emergency-stop-signal outputting unit in the amplifier according to Embodiment 2 of the present invention.

FIG. 7 is a block diagram illustrating an emergency-stop-control system utilizing serial communication, in which, when an emergency-stop signal transmitted by the drive control apparatus for one of axles is received by respective drive control apparatuses for the rest of the axles, the respective drive control apparatuses attach to (copy in) a serial-data frame to be outputted by themselves the emergency-stop signal outputted by the drive control apparatus for one of the axles and transmits the frame. The case will be discussed in which, in the system in FIG. 1, totally three control amplifiers (AMP1, AMP2, and AMP3) are connected. Because as many communication frames as the number of connected axles are transmitted, a serial-data receiving unit 212 copies all of these communication frames and retrieves them to the communication control unit. The receiving unit in the communication control unit 106 applies reception sequence processing to all transmitted frames; however, the receiving unit neglects data that is not related to the frame of its own, even though an end flag is extracted, and retrieves to a reception buffer data related to itself only. However, even when the extracted data is not related to the frame of its own, if, in the extracted data, an emergency-stop signal is detected and a frame error is not detected, only the emergency-stop signal is stored in a logical operation circuit 207. In the case where, at the timing when the reception sequence for all the frames has been completed, an emergency-stop signal is held in the logical operation circuit 207, the emergency-stop signal is transmitted, by way of a logical operation circuit 215 and a motor-controlling-unit emergency-stop input line 210, to a motor controlling unit 114 arranged under the communication control unit 106 in FIG. 1.

When receiving the emergency-stop signal, the motor controlling unit 114 outputs an instruction for stopping power supply to the motor so as to decelerate and halt the motor. Additionally, the motor controlling unit 114 outputs from a motor-controlling-unit emergency-stop output line 211 to the communication control unit an emergency-stop signal indicating that the motor itself that is driven by the controlling unit 114 is in an emergency-stop state. The motor-controlling-unit emergency-stop output line 211 is a line for communicating information indicating that the motor itself is in an emergency-stop state. A emergency-stop-signal adding unit 209 has a function of holding the emergency-stop signal transmitted from the logical operation circuit 215; therefore, it is possible to add (copy) the emergency-stop signal outputted from the emergency-stop signal input 211 and to output an emergency-stop signal. The emergency-stop signal outputted from the emergency-stop-signal adding unit 209 is sent to an emergency-stop-data generating unit 209 in the transmission unit; then, in a serial-data transmitting unit, an emergency-stop signal is generated. The emergency-stop signal is outputted as serial data to an upper- or lower-layer axle via the serial-data transmitting unit 214 and outputted via a serial-data transmitting driver 145 (refer to FIG. 1). Meanwhile, the other operation of the transmitting unit is the same as the operation in Embodiment 1, illustrated in FIG. 2; therefore, the explanation will be omitted.

Figure 8:
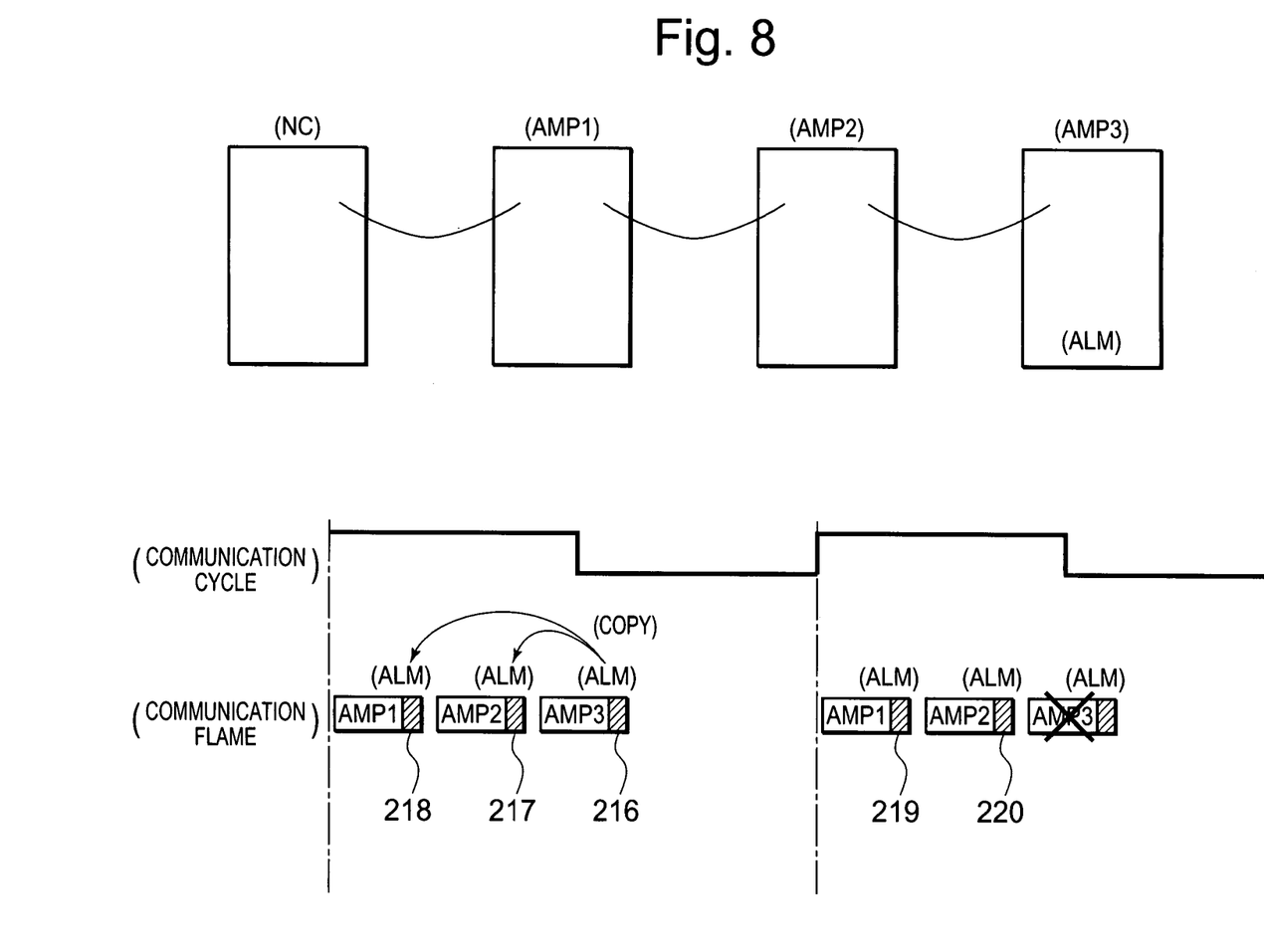
FIG. 8 is a diagram representing timing for an alarm-copy function in FIG. 7.

FIG. 8 illustrates frame-transmission timing and an emergency-stop signal (ALM) within a communication frame in communication (upstream) from a slave (amplifier) to a master (NC apparatus), in the case where three-axle amplifiers are connected to the NC apparatus. At the communication timing, the emergency-stop signal included in a frame 216 outputted from the AMP3 is copied in frames 217 and 218 for the other axles. Even when, due to defective communication, AMP3 that has outputted the emergency-stop signal is not enabled to communicate at the next communication timing, it is possible to transmit the emergency-stop signal, by utilizing the emergency-stop signals copied in frames 219 and 220; therefore, reliability can be enhanced.

In addition, Embodiment 2 can be implemented in combination with constituent elements explained in Embodiment 1.

Embodiment 3

Next, Embodiment 3 of the present invention will be explained with reference mainly to FIGS. 9 and 10.

Figure 9:
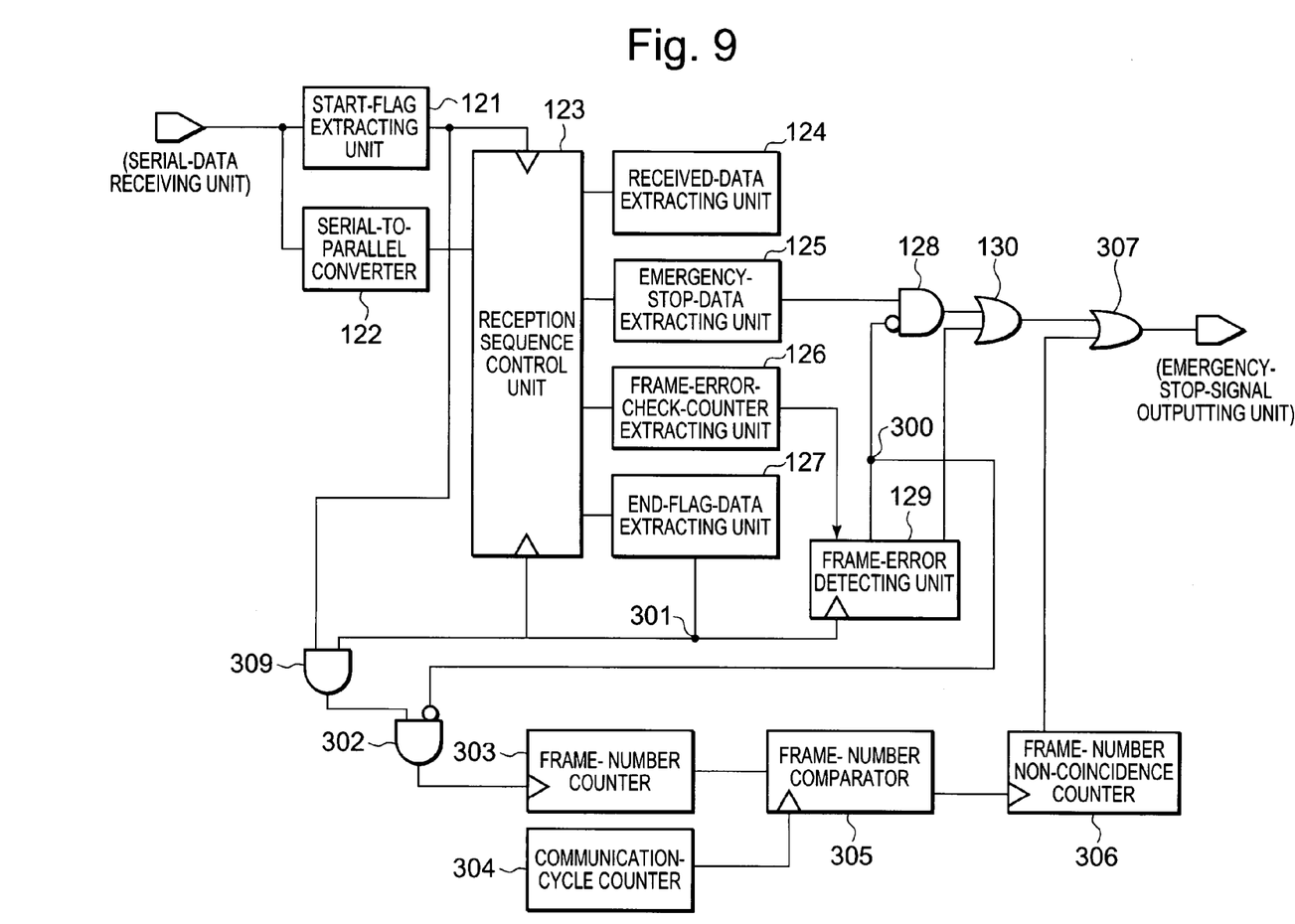
FIG. 9 is a block diagram illustrating an emergency-stop-signal outputting unit having a frame-number non-coincidence counter, according to Embodiment 3 of the present invention.

Embodiment 3 is obtained by reconfiguring as illustrated in FIG. 9 the data-receiving unit in the communication control unit, illustrated in FIG. 5, in Embodiment 1. In other words, as illustrated in FIG. 9, the data-receiving unit in Embodiment 3 is configured, by adding to the data-receiving unit illustrated in FIG. 5 a logical operation circuits 302 and 309, a frame-number counter 303, a communication-cycle counter 304, a frame-number comparator 305, and a frame-number non-coincidence counter 306. Accordingly, it is possible to check the number of frames in data, whereby an emergency stop is enabled at the timing of a communication cutoff due to disconnection of a connector or the like. In addition, other parts of the data-receiving unit in Embodiment 3 are the same as those in FIG. 5.

The "frame-number", here, denotes a total number of serial-data frames outputted every communication timing from respective drive control apparatuses connected to an NC apparatus; for example, in the case where three drive control apparatuses (single-axle type) are connected, the frame-number is "3", and three frames are transmitted and received every communication timing.

Next, the operation of the data-receiving unit will be explained. In FIG. 9, frame-error information of the received frame, that is outputted from the frame-error detecting unit 129, exists in data 300; in the case where there is a frame error, "H (positive)" is outputted, and, otherwise, "L (negative)" is outputted. The end flag in the received frame is outputted as data 301. The logical operation circuit 309 calculates the logical sum of the end flag data 301 and data outputted from the start-flag extracting unit; if it is ascertained that the processing of the received frame has been appropriately implemented and completed, the logical operation circuit 309 outputs H (positive) to the logical operation circuit 302. The logical operation circuit 302 calculates the logical sum of the data 300 from the frame-error detecting unit 129 and the flag, from the logical operation circuit 309, that indicates that the reception processing of the frame has appropriately be completed; when the frame-error information is L (negative), the counter value of the frame-number counter 303 is counted up by one. When, in the case where three single-axle-type drive control apparatuses are connected, the processing has been normally completed, the reception sequence is implemented three times, thereby outputting three each of the start flags and the end flags. If no frame error is detected with regard to the three frames, the logical operation circuit 302 outputs H (positive) three times. Accordingly, the numerical value of the frame-number counter 303 becomes "3". Being triggered by the communication-cycle counter 304, the frame-number comparator 305 compares a preset frame number (in the case where three drive control apparatuses (in this regard, however, single-axle-type) are connected, the frame number is "3") and the counter number that is sent from the frame-number counter 303. If the compared numerical values are different, the frame-number comparator 305 outputs a H (positive) signal; if the compared numerical values are the same, the frame-number comparator 305 outputs a L (negative) signal.

If the result of the comparison sent from the frame-number comparator 305 is H (positive), the frame-number non-coincidence counter 306 determines that there is a malfunction, thereby counting up the count value by one. Then, if the count value exceeds a preset value, the frame-number anti-coincidence counter 306 outputs to a logical operation circuit 307 H (positive) data; otherwise, the frame-number anti-coincidence counter 306 outputs L (negative) data. If either one of the outputs from the frame-number anti-coincidence counter 306 and from the logical operation circuit 308 is H (positive), the logic circuit 307 outputs an emergency-stop signal.

Therefore, by adding to the data-receiving unit, in FIG. 5, according to Embodiment 1 these circuits (the logical operation circuits 302 and 309, the frame-number counter 303, the communication-cycle counter 304, the frame-number comparator 305, and the frame-number non-coincidence counter 306), emergency-stop processing through checking of the number of frames in data is enabled.

Figure 10:
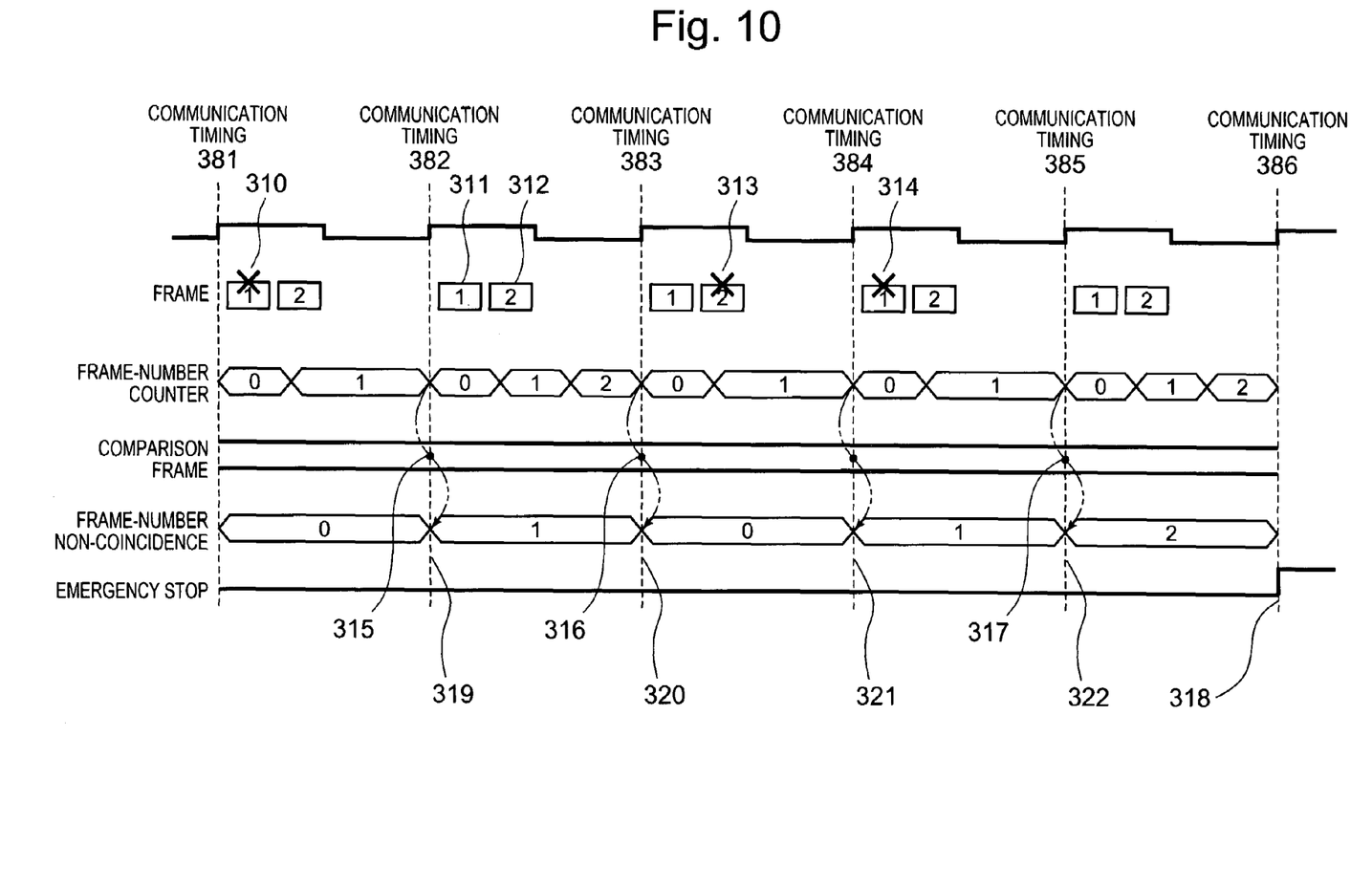
FIG. 10 is a timing chart representing communication timing and frame-number comparison in the emergency-stop-signal outputting unit in FIG. 9.

FIG. 10 represents a relationship, in this situation, between the communication-data structure and the communication timing. As an example, it is assumed that, in the case where the number of communication frames is 2, the number of comparison frames is 2, and an emergency-stop signal is outputted, the value of the non-coincidence counter is 2.

At communication timing 381, in the case where a frame 1, e.g., a received frame 310, has not been received, only a frame 2 has been able to be received; therefore, the value of the frame-number counter 303 becomes 1 at the timing when the communication timing 381 ends. At comparison timing 315, the frame-number comparator 305 compares the value of the frame-number counter 303 with the number of comparison frames; because the value of the frame-number counter 303 is 1, and the number of comparison frames is 2, the numbers of frames do not coincide with each other, whereby the value of the frame-number non-coincidence counter 306 becomes 1 at frame-number non-coincidence counter updating timing 319. Next, at communication timing 382, both the frame 1 indicated by Reference Numeral 311 and the frame 2 indicated by Reference Numeral 312 have been able to normally be received; therefore, the value of the frame-number counter 303 becomes 2 at the timing when the communication timing 382 ends. At comparison timing 316, the frame-number comparator 305 compares the value of the frame-number counter 303 with the number of comparison frames; because the both coincide with each other, the value of the frame-number non-coincidence counter 306 is cleared to 0 at frame-number non-coincidence counter updating timing 320. In other words, in Embodiment 3, in the case where the numbers of frames coincide with each other, the value of non-coincidence counter is cleared, whereby unnecessary output of an emergency-stop signal can be prevented.

At communication timing 383, the frame 2 indicated by Reference Numeral 313 can not be received; accordingly, when the frame-number comparator 305 compares the value ("1") of the frame-number counter 303 with the number ("2") of comparison frames, the numbers of frames do not coincide with each other, whereby the value of the frame-number non-coincidence counter 306 becomes 1 at frame-number non-coincidence counter updating timing 321. At communication timing 384, the frame 1, indicated by Reference Numeral 314, has not been able to be received again; accordingly, when, at comparison timing 317, the frame-number comparator 305 compares the value ("1") of the frame-number counter 303 with the number ("2") of comparison frames, the numbers of frames do not coincide with each other, whereby the value of the frame-number non-coincidence counter 306 is counted up by one to 2 at frame-number non-coincidence counter updating timing 322. In this situation, because the count value of the frame-number non-coincidence counter 306 and the non-coincidence count value (being set to "2", in Embodiment 3) with which an emergency-stop signal is supposed to be outputted have coincided with each other, an emergency-stop signal 318 is outputted at communication timing 386. As described above, it is possible that, when frames have not been able to be received continuously a specific times corresponding to the preset value of the frame-number non-coincidence counter 306, an emergency-stop signal is outputted.

In addition, Embodiment 3 can be implemented in combination with either constituent elements explained in Embodiment 1 or constituent elements explained in Embodiment 2, or in combination with constituent elements explained in Embodiments 1 and 2.

Embodiment 4

In Embodiments 1 through 3 described above, the case has been explained in which the present invention is applied to an NC apparatus system that is made up of control amplifiers for controlling motors for respective axles and an NC apparatus that transmits to and receives from the control amplifiers instructions and communication data; however, the present invention is applicable not only to an NC apparatus system but also to a control system, and the like, in which a single principal controller integrally controls a plurality of terminal control apparatuses, e.g., a control system in which a plurality of programmable logic controllers (corresponding to control amplifiers in an NC apparatus system) are connected to a principal control apparatus (corresponding to an NC apparatus in the NC apparatus system), and data is transmitted and received between the principal control apparatus and the plurality of programmable logic controllers, or among the programmable logic controllers.

INDUSTRIAL APPLICABILITY

As described heretofore, a control system utilizing serial communication, according to the present invention, is suitable for a control system in which, in order to reduce a dedicated line for an emergency stop, emergency-stop information is stored in an ordinary serial-data frame, i.e., a control system in which a single principal controller integrally controls a plurality of terminal control apparatuses.

What is claimed is:

1. A control system utilizing serial-data communication, in which the serial-data communication between a host control apparatus and at least one client control apparatus is performed, the control system comprising: a first processing unit configured in the host control apparatus to embed emergency-stop data in a serial-data communication frame when a malfunction occurs inside the host control apparatus, when an emergency-stop signal is inputted to the host control apparatus, to embed predetermined frame-error check data in the serial-data communication frame each time the serial-data communication frame is generated, and to output the frame to the client control apparatus; an extracting unit configured in the client control apparatus to extract the emergency-stop data and the frame-error check data from the frame that is transmitted from the host control apparatus to the client control apparatus; and a second processing unit configured in the client control apparatus to determine whether or not the frame has been generated normally in the host control apparatus by checking the frame-error check data extracted by the extracting unit, to output to an apparatus to be controlled the emergency-stop data when the emergency-stop data is embedded in the serial-data communication frame, and the frame is generated normally in the host control apparatus, to block output of the emergency-stop data to the apparatus to be controlled when the emergency-stop data is embedded in the serial-data communication frame, and the frames is not generated normally in the host control apparatus, and to generate a signal for outputting to the apparatus to be controlled the emergency-stop data when condition in which the frame is not generated normally in the host control apparatus is continued for a duration corresponding to a plurality of frames.

2. The control system utilizing serial-data communication according to claim 1, further comprising:
   a voltage level converter to convert a voltage level of the emergency-stop data to a voltage level utilized within the host control apparatus;
   a communication control unit to convert the emergency-stop data into serial data; and
   a communication connector to transmit the converted emergency-stop data.

3. The control system utilizing serial-data communication according to claim 1, wherein data that is transmitted and received between the host control apparatus and the client control apparatus comprises:
   a start-flag generating unit for, on reception, generating a start flag required to start reception sequence;
   a transmission-data generating unit for generating transmission data in which a positional instruction, speed instruction, and other data for communication are put together;
   an emergency-stop data generating unit for generating an emergency-stop data that has been inputted through a receiver to the host control apparatus;
   a frame-error check counter generating unit for adding a present value to a frame-error check counter area in a transmission frame at predetermined time intervals; and
   an end-flag generating unit for generating an end flag that indicates an end of data transmission.

4. The control system utilizing serial-data communication according to claim 1, further comprising:
   an emergency-stop data adding unit for holding received emergency-stop data in order to copy the emergency-stop data for transmission to an emergency-stop data generating unit.

5. The control system utilizing serial-data communication according to claim 1, wherein the emergency-stop data is received from an emergency stop switch in a non-serial format by the host control apparatus and wherein voltage level of the received emergency-stop data is higher than voltage level utilized in the host apparatus.

6. A control system utilizing serial-data communication, in which the serial-data communication between a host control apparatus and at least one client control apparatus is performed, the control system comprising:
   a first processing unit configured in the client control apparatus to embed emergency-stop data in a serial-data communication frame to be outputted by the client control apparatus when a malfunction occurs inside the client control apparatus, to embed predetermined frame-error check data in the serial-data communication frame to be outputted by the client control apparatus each time the serial-data communication frame is generated, and to output the frame to the host control apparatus;

an extracting unit configured in the host control apparatus to extract the emergency-stop data and the frame-error check data from the frame that is transmitted from the client control apparatus to the host control apparatus; and a second processing unit configured in the host control apparatus to determine whether or not the frame has been generated normally in the client control apparatus by checking the frame-error check data extracted by the extracting unit, to determine that the client control apparatus is in order when the emergency-stop data is embedded in the serial-data communication frame and the frame is generated normally in the client control apparatus, and to determine that the client control apparatus is out of order when the emergency-stop data is embedded in the serial-data communication and condition in which the frame is not generated normally in the client control apparatus is continued for a duration corresponding to a plurality of frames.

7. The control system utilizing serial-data communication according to claim 6, further comprising:
   a voltage level converter to convert a voltage level of the emergency-stop data to a voltage level utilized within the host control apparatus;
   a communication control unit to convert the emergency-stop data into serial data; and
   a communication connector to transmit the converted emergency-stop data.

8. The control system utilizing serial-data communication according to claim 6, wherein data that is transmitted and received between the host control apparatus and the client control apparatus comprises:
   a start-flag generating unit for, on reception, generating a start flag required to start reception sequence;
   a transmission-data generating unit for generating transmission data in which a positional instruction, speed instruction, and other data for communication are put together;
   an emergency-stop data generating unit for generating an emergency-stop data that has been inputted through a receiver to the host control apparatus;
   a frame-error check counter generating unit for adding a present value to a frame-error check counter area in a transmission frame at predetermined time intervals; and
   an end-flag generating unit for generating an end flag that indicates an end of data transmission.

9. The control system utilizing serial-data communication according to claim 6, further comprising:
   an emergency-stop data adding unit for holding received emergency-stop data in order to copy the emergency-stop data for transmission to an emergency-stop data generating unit.

10. The control system utilizing serial-data communication according to claim 6, wherein the emergency-stop data is received from an emergency stop switch in a non-serial format by the host control apparatus and wherein voltage level of the received emergency-stop data is higher than voltage level utilized in the host apparatus.

11. A control system utilizing serial-data communication, in which the serial-data communication between a host control apparatus and a plurality of client control apparatuses, or among the plurality of client control apparatuses, is performed, the control system comprising: a first processing unit configured in the client control apparatus to embed emergency-stop data in a serial-data communication frame to be outputted by the client control apparatus when a malfunction occurs inside of the client control apparatus, when an emergency-stop signal is inputted to the client control apparatus, to embed predetermined frame-error check data in the serial-data communication frame to be outputted by the client control apparatus each time the serial-data communication frame is generated, and to output the frame to the host control apparatus and/or the other client control apparatus; an extracting unit configured in the client control apparatus to extract the emergency-stop data and the frame-error check data from the frame that is transmitted from the host control apparatus and /or the other client control apparatus; and a second processing unit configured in the client control apparatus to determine whether or not the frame has been generated normally in the host control apparatus and/or the other client control apparatus by checking the frame-error check data extracted by the extracting unit, to output to an apparatus to be controlled the emergency-stop data when the emergency-stop data is embedded in the serial-data communication frame and the frame is generated normally in the host control apparatus and/or the other client control apparatus, to block output of the emergency-stop data to the apparatus to be controlled when the emergency-stop data is embedded in the serial-data communication frame and the frame is not generated normally in the host control apparatus and/or the other client control apparatus, and to generate a signal for outputting to the apparatus to be controlled the emergency-stop data when condition in which the frame is not generated normally in the host control apparatus and/or the other client control apparatus is continued for a duration corresponding to a plurality of frames.

12. The control system utilizing serial-data communication according to claim 11, further comprising:
    a voltage level converter to convert a voltage level of the emergency-stop data to a voltage level utilized within the host control apparatus;
    a communication control unit to convert the emergency-stop data into serial data; and
    a communication connector to transmit the converted emergency-stop data.

13. The control system utilizing serial-data communication according to claim 11, wherein data that is transmitted and received between the host control apparatus and the client control apparatus comprises:
    a start-flag generating unit for, on reception, generating a start flag required to start reception sequence;
    a transmission-data generating unit for generating transmission data in which a positional instruction, speed instruction, and other data for communication are put together;
    an emergency-stop data generating unit for generating an emergency-stop data that has been inputted through a receiver to the host control apparatus;
    a frame-error check counter generating unit for adding a present value to a frame-error check counter area in a transmission frame at predetermined time intervals; and
    an end-flag generating unit for generating an end flag that indicates an end of data transmission.

14. The control system utilizing serial-data communication according to claim 11, further comprising:

an emergency-stop data adding unit for holding received emergency-stop data in order to copy the emergency-stop data for transmission to an emergency-stop data generating unit.

15. The control system utilizing serial-data communication according to claim 11, wherein the emergency-stop data is received from an emergency stop switch in a non-serial format by the host control apparatus and wherein voltage level of the received emergency-stop data is higher than voltage level utilized in the host apparatus.

16. The control system utilizing serial-data communication, according to any one of claim 1 through 11, wherein the first processing unit generates the frame-error check data to which a specific numerical value is added when the frame is generated normally each time the serial-data communication frame is generated, and embeds the generated frame-error check data in the frame; and wherein the second processing unit compares previously received frame-error check data with presently received frame-error check data and determines that the frame is not generated normally when a difference value between the previously received frame-error check data and the presently received frame-error check data is different from the specific numerical value.

17. The control system utilizing serial-data communication according to any one of claim 1 through 11, in which the serial-data communication between the host control apparatus and the plurality of client control apparatuses, or among the plurality of client control apparatuses, is performed, the control system comprising:

a third processing unit configured in the client control apparatus to embed the emergency-stop data generated by the other client control apparatus in the frame to be outputted by the client control apparatus, and to transmit the frame to the host control apparatus and/or the other client control apparatus.

18. The control system utilizing serial-data communication according to any one of claims 1 through 11, comprising:

a counting unit configured in the host control apparatus and/or the client control apparatus to count the number of the received frames; and a third processing unit configured in the host control apparatus and/or the client control apparatus to output the emergency-stop signal in the case where a specific number of frames are not received.

* * * * *